United States Patent

Swanson

[15] 3,671,819

[45] June 20, 1972

[54] METAL-INSULATOR STRUCTURES AND METHOD FOR FORMING

[72] Inventor: John G. Swanson, Monroeville, Pa.

[73] Assignee: Westinghouse Electric Corporation, Pittsburgh, Pa.

[22] Filed: Jan. 26, 1971

[21] Appl. No.: 109,846

[52] U.S. Cl. ..............................317/234, 317/101, 317/230, 204/15

[51] Int. Cl. ..............................H01l 7/24

[58] Field of Search ..............................317/230, 231, 101; 204/15, 204/33; 174/68.5

[56] References Cited

UNITED STATES PATENTS

| | | | |
|---|---|---|---|
| 2,793,178 | 5/1957 | Morris, Jr. | 204/15 |
| 3,364,300 | 1/1968 | Bradham | 174/68.5 |
| 3,491,197 | 1/1970 | Walkow | 317/101 |
| 3,541,222 | 11/1970 | Parks et al. | 317/101 |

*Primary Examiner*—James D. Kallam
*Attorney*—F. H. Henson, C. F. Renz and A. S. Oddi

[57] ABSTRACT

Metal-insulator structures and methods for forming such structures wherein a substrate comprising a metallic material, which in the presence of an electrolyte under anodic conditions forms a porous oxide coating, such as aluminum, is completely anodized at selected areas to form insulating areas through the substrate. Also backing layers and masking layers comprising a material which forms a passivating coating in the presence of the electrolyte under anodic conditions, such as titanium, may be deposited on the substrate for controlling the anodization process.

16 Claims, 4 Drawing Figures

WITNESSES
Theodore F. Wrobel
James F. Young

INVENTOR
John G. Swanson
BY
ATTORNEY

METAL-INSULATOR STRUCTURES AND METHOD FOR FORMING

BACKGROUND OF THE INVENTION

1. Field of the Invention

The present invention relates to metal-insulator structures and methods for making such structures and, more particularly, to such structures and methods for use in thin film applications.

2. Description of the Prior Art

In thin film microelectronics and in thin film imaging devices, it is often required to make electrical interconnections between components deposited on opposite surfaces of an insulating substrate. Depositing conducting strips exteriorly of the substrate between the opposite surfaces is cumbersome, if not impossible in many applications. The most convenient approach for making interconnections between opposite surfaces of the substrate is directly through the substrate itself. Due to the small physical dimensions of such thin film substrates, providing internal interconnections is quite difficult. One technique that has been used involves fusing together a bundle of glass coated tungsten wires by heating the bundle to above the fusion temperature of the glass to provide a unitary structure. Sections are then cut to the desired thickness perpendicular to the axis of the wire. The only structure produced by this technique is a hexagonal array of circular metal areas wherein the diameter of the areas is that of the wire employed. Moreover, this technique requires special glass working equipment for the production of even the single type of hexagonal pattern. An additional problem of the glass-tungsten structures is that the thinnest such structures can be made is approximately 20 mils. If a thinner structure is desired it must be thinned by grinding. Since tungsten is a hard metal and glass is very brittle, the grinding process causes chipping at the glass-metal surface interface. If the thinned structure were to be used as a substrate discontinuities would exist in an evaporated film deposited on the ground surface region. It would thus be highly desirable if a thin film substrate could be fabricated employing relatively simple techniques not requiring special equipment, which offers flexibility in the metal-insulator arrangement fabricated and which may be produced at the desired thickness without the introduction of discontinuities at the outer surfaces of the substrate.

SUMMARY OF THE INVENTION

Broadly, the present invention provides a metal-insulator structure and methods of forming such structures wherein selective areas of a substrate comprising a metallic material which in the presence of an electrolyte under anodic conditions forms an oxide coating are completely anodized through the structure to provide respective insulating and metallic areas through the structure.

DESCRIPTION OF THE PREFERRED EMBODIMENT

Figure 1:
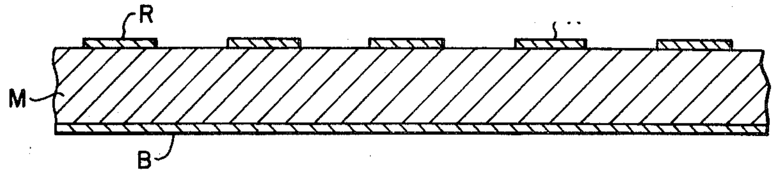
FIG. 1 is a sectional view of a substrate prepared for fabrication according to a method of the present invention to form a structure of the present invention.

Referring to FIG. 1, a metal substrate M is shown prepared for fabricating into a metal-insulator structure of the present invention. The metal substrate M comprises a material, which in the presence of an electrolyte under anodic conditions forms a porous oxide coating, such as aluminum. The substrate M may for example comprise an aluminum foil having a thickness of approximately 1 mil. The metallic material which forms a porous oxide coating in the presence of an electrolyte under anodic conditions is required to ensure the complete anodization of the metal substrate M from the top to the bottom surface. A material such as aluminum which forms a porous oxide coating permits ions to reach the surface of the metal in order to continue the oxidation process. If a barrier type of anodic coating were formed, extremely large voltages would be required to sustain the oxidation process due to the inability of ions to penetrate the barrier layer. Hence the porous barrier layer formed by aluminum under anodization permits the continuation of the oxidation completely through the substrate structure so that areas from the top to the bottom of the substrate of an insulating oxide may be formed. A resist pattern R is deposited on the top surface of the substrate M to define the metal areas which are not to be anodized in an electrolyte. A backing layer B is also shown in FIG. 1 deposited onto the bottom surface of the substrate M, whose function will be explained below.

The thus arranged structure as shown in FIG. 1 is immersed in an electrolyte for anodization of the unmasked areas to form oxide areas therebetween. An electrolyte which may be used is 7 percent sulfuric acid which is maintained at a temperature of approximately −7° C. to minimize the dissolution of the oxide in the electrolyte. A satisfactory current density has been found to be approximately 0.8 $amps/cm^2$. The anodization process is continued until insulating oxide areas are completely formed between the top and bottom surfaces of the substrate M at the unmasked areas of the substrate.

It was found in anodizing aluminum foil substrates without the backing layer B that anodization was completed through the substrate in some areas before others owing to local variations in the structure of the metal. This would cause metal island areas to be formed which would be completely surrounded by the insulating oxide. By depositing the backing layer B onto the substrate M homogeneity in anodization was achieved, with the backing layer comprising a conducting material preserving electrical conductivity to the residual metal areas until they were completely anodized. It was determined that by vacuum depositing a layer of a backing material which forms a passivating coating in the presence of the electrolyte under anodic conditions produced homogeneous oxide areas. Such passivating materials for the backing layer B may comprise titanium, tantalum, niobium, zirconium and chromium, with titanium being highly effective in this usage.

The resist pattern R may be formed on the top surface of the substrate M through the use of photoresist materials and techniques. However, adhesion was found to be very poor with such photoresist materials, especially when the top surface of the substrate was polished. Therefore, the masking pattern R is ideally formed by the vacuum deposition of a material such as that employed for the backing layer, that is, a material which forms a passivating coating in the presence of the electrolyte under anodic conditions. The same materials as listed above for the backing layer B may be employed with titanium being ideally suited for the formation of the resist pattern.

Both the backing layer B and the resist pattern R may be vacuum deposited titanium to the thickness of approximately 1,000A units. Passivating materials, especially titanium, are particularly suitable for formation of the resist pattern R and the backing layer B because they bond strongly to aluminum surfaces and do not lift during anodization. Moreover, such materials are inert to the electrolyte as soon as passivation has occurred. After the metal-insulator structure has been formed by the complete anodization from top to bottom surface of the substrate M the resist pattern R and the metal backing layer B may be removed by the placement of the structure for a few seconds, for example, in a 10 percent hydrofluoric acid solution. This was found to remove effectively the layers R and B while only causing slight etching of the aluminum areas and negligible damage to the oxide insulating areas.

Figure 3:
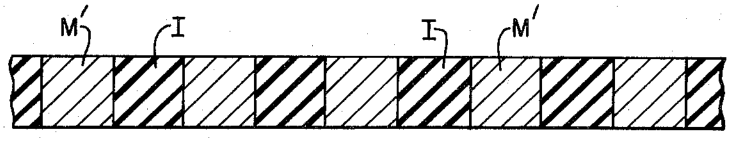
FIG. 3 is a sectional view taken along the line III—III of FIG. 2.
Figure 2:
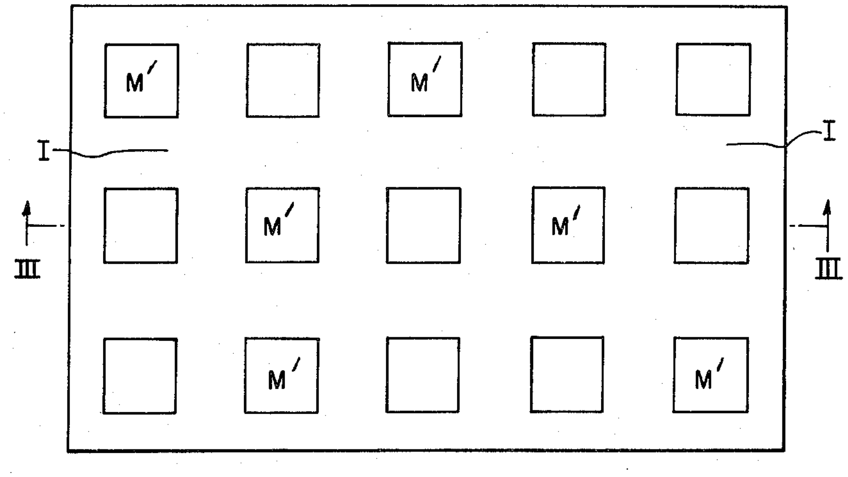
FIG. 2 is a plan view of the structure of the present invention.

FIGS. 2 and 3 show a completed structure wherein selected areas M' of the metallic substrate remain and are surrounded by insulating oxide areas I produced in the anodization process as described above. As shown in FIG. 2 a matrix of substantially square metallic areas M' are produced surrounded by the insulating oxide areas I. As shown in FIG. 3 metallic areas M' extend completely through the substrate from the top to the bottom of the substrate. Also the insulating areas I extend completely through the substrate being formed by the complete anodization of the metallic substrate into the oxide.

The particular pattern of the metallic areas appearing on the structure is determined by the particular manner in which the resist pattern is deposited on the substrate prior to oxidation. The five-by-three matrix arrangement shown in FIG. 2 is only by way of an example. Any pattern could be deposited upon the top surface much as is done with printed circuits formed to provide a desired circuit configuration or other configuration on the top surface of the substrate which after anodization will provide a structure having metallic areas corresponding to the pattern completely therethrough. Various input circuit connections can thus be made to the desired metal areas on one side of the structure with an electrical circuit passage provided through the respective metal areas to the other side of the structure wherein output electrical circuit connections can be made as desired. Moreover, if desired, a plurality of the structures as shown in FIGS. 2 and 3 may be stacked to form a composite structure providing various electrical interconnections as desired through the composite stack.

In producing structures such as shown in FIGS. 2 and 3, etch factors of approximately 0.3 have been achieved, that is, the anodization proceeds three units vertically for each unit horizontally. From this it can be seen that resolution of metal areas produced in this process is limited by the initial thickness of the metal foil. It has been found that metal areas cannot be spaced closer than approximately 0.6 of the foil thickness and diameters cannot be smaller than approximately 0.6 of the foil thickness. Thus the limits are defined by the thickness of the foil which can be conveniently handled without damage. Using 1 mil thick aluminum foil 10 × 10 arrays of 10 mil square metal areas on 40 mil centers have been regularly produced with good delineation.

Although the metal insulator interfaces within the structure of FIG. 3 are shown to be perpendicular with respect to the top and bottom outside surfaces, it should be understood that in actuality the metal-insulator interfaces will be somewhat curved according to the thickness of the substrate foil and the length of the anodization process employed. However this does not affect the ultimate structure produced as being one wherein a plurality of metal areas are provided on one surface of a substrate which extend completely through the substrate to the other outside surface and wherein the individual metal areas are electrically insulated from one another by oxide areas.

If it is desired to fabricate structures as described above of a thickness of the order of several hundreds of a mil, a process wherein a barrier type, anodic layer is formed may be employed. An anodizing voltage of approximately 30 volts per Angstrom unit is required. Thus, for a substrate of 0.2 mils a voltage of 400 volts would be required. With an aluminum substrate, suitable electrolytes are tartaric, boric and citric acids. This technique may be desirable when very thin structures having high insulating quality oxide portions are required.

Structures of the type shown in FIGS. 2 and 3 find advantageous application with imaging devices wherein an array of photo-responsive devices are disposed on one surface of a substrate, and it is desired to translate the electrons produced to the opposite surface of the substrate. Such an embodiment is shown in FIG. 4.

Figure 4:
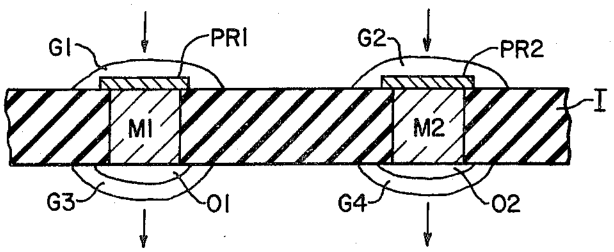
FIG. 4 is a partial sectional view showing the employment of the structure of the present invention in an imaging device environment.

In FIG. 4 only two photo-responsive devices PR1 and PR2 are shown disposed over the top interface of metal areas M1 and M2 extending through the structure and surrounded by insulating oxide material. However it should be understood that an array of such devices could be arranged in configuration such as shown in FIG. 2 of other configurations as desired. The photo-responsive devices PR1 and PR2 are deposited on the top surface of the structure over the respective metal areas M1 and M2 and have deposited thereover metal layers G1 and G2, respectively, which may comprise gold for example. The photo-responsive devices PR1 and PR2 may comprise photoconductors such as cadmium sulfide or cadmium selenide, for example. On the bottom surface of the structure as shown in FIG. 4 a thin barrier of aluminum oxide is formed at the interface which is illustrated as the layers G1 and G2, respectively, for the metal areas M1 and M2. A metal layer G3 and a metal layer G4 are disposed, respectively, over the layers Q1 and Q2 to complete the arrangement. A source of operating potential, not shown, would be connected between the contact layers G1 and G3 for the devices PR1 and between the layers G2 and G4 of the device PR2.

In response to incident radiation on the devices PR1 and PR2 the impedance thereof drops to increase the bias voltage across the metal-insulator interface so that electrons are emitted and outputted from the bottom contact layers G3 and G4, respectively. Hence a convenient structure is provided for the deposition of photo-conductive devices on one surface of a substrate and photo-emitting devices with the electrons produced in response to incident radiation on one side being outputted from other surface for utilization.

I claim:

1. A metal-insulator structure comprising:

a substrate for use in electronic devices comprising an integral unitary sheet having a plurality of separate areas of metal and a plurality of areas of electrically insulative metallic oxide separating the separate areas of metal, said sheet having opposite surfaces with said areas of metal and oxide being continuous from one of the surfaces to the other and said areas of metal being spaced apart by a distance of at least approximately 0.6 of the sheet thickness and each of a diameter of at least approximately 0.6 of the sheet thickness.

2. The structure of claim 1 wherein:

said oxide is porous.

3. The structure of claim 1 wherein:

said metal comprises aluminum.

4. The structure of claim 1 includes:

photo-responsive means associated with predetermined of said areas of material on one surface of said substrate responsive to light input thereto for instigating the emission of electrons for outputting from the opposite surface of said substrate.

5. A method of fabricating a metal-insulator substrate for use in electronic devices comprising the steps of:

masking a plurality of separate areas of an anodizable metal sheet, said masked areas being spaced apart at least by distance of 0.6 the thickness of said sheet, and having a distance at least 0.6 the thickness of said sheet while leaving the remaining areas of said sheet exposed, exposing said masked sheet to anodizing electrolyte, applying a potential between said sheet and electrolyte for anodizing the exposed areas of said sheet completely from one surface thereof to the other whereby said masked areas of metal are separated by insulating areas.

6. The method of claim 5 wherein:

said insulating areas formed are a porous oxide.

7. The method of claim 5 wherein:

said metal comprises aluminum.

8. The method of claim 5 includes the step of:

depositing a backing layer on said substrate, said backing layer comprises a material which forms a passivating coating in the presence of an electrolyte under said anodizing conditions to ensure homogeneity of said insulating areas.

9. The method of claim 8 wherein:

said backing layer material is selected from a group consisting of titanium, tantalum, niobium, zirconium and chromium.

10. The method of claim 9 wherein:

said backing material comprises titanium.

11. The method of claim 10 wherein said metal comprises aluminum.

12. The method of claim 8 includes the step of:

stripping said backing layer from said substrate by depositing it in an etching solution.

13. The method of claim 5 wherein:

said masking comprises applying a masking material which forms a passivating coating in the presence of an electrolyte under said anodizing conditions.

14. The method of claim 13 wherein:

said masking material is selected from a group consisting of titanium, tantalum, niobium, zirconium and chromium.

15. The method of claim 13 wherein:

said masking material comprises titanium.

16. The method of claim 15 wherein:

said metal comprises aluminum.

* * * * *